United States Patent
Sasaki et al.

(10) Patent No.: US 6,412,187 B1
(45) Date of Patent: Jul. 2, 2002

(54) ANALOG QUANTITY DISPLAY METHOD, ANALOG QUANTITY MEASURING METHOD, AND DIGITAL/ANALOG DISPLAY TYPE MEASURING INSTRUMENT

(75) Inventors: Koji Sasaki; Yoshitaka Kuji; Yuichi Ichikawa; Mikio Suzuki; Norihide Tsuyuki, all of Kawasaki; Hiroyuki Ohta, Utsunomiya, all of (JP)

(73) Assignee: Mitutoyo Corporation, Kanagawa (JP)

( * ) Notice: Subject to any disclaimer, the term of this patent is extended or adjusted under 35 U.S.C. 154(b) by 0 days.

(21) Appl. No.: 09/480,998

(22) Filed: Jan. 11, 2000

(30) Foreign Application Priority Data

Jan. 19, 1999 (JP) .............................................. 11-10003

(51) Int. Cl.$^7$ ................................................ G01B 3/22
(52) U.S. Cl. ........................... 33/784; 33/542; 33/679.1
(58) Field of Search ....................... 33/784, 365, 366.11, 33/366.27, 792, 793, 818, 819, 820, 821, 827, 679.1, 542, 543

(56) References Cited

U.S. PATENT DOCUMENTS

| | | | |
|---|---|---|---|
| 4,247,855 A | | 1/1981 | Uede et al. |
| 4,265,026 A | * | 5/1981 | Meyer ........................... 33/543 |
| 4,314,146 A | | 2/1982 | Berney |
| 4,505,042 A | | 3/1985 | Nishina |
| 4,604,809 A | * | 8/1986 | Meyer, Jr. ..................... 33/542 |
| 4,795,972 A | | 1/1989 | Roppelt et al. |
| 4,839,833 A | * | 6/1989 | Parhiskari ..................... 33/784 |
| 4,862,395 A | | 8/1989 | Fey et al. |
| 4,905,378 A | * | 3/1990 | Culver et al. .................. 33/542 |
| 5,251,381 A | * | 10/1993 | Turner et al. .................. 33/542 |
| 5,313,713 A | * | 5/1994 | Heger et al. .............. 33/366.27 |
| 5,317,814 A | * | 6/1994 | Rogler .......................... 33/542 |
| 5,440,819 A | * | 8/1995 | Marsh et al. ................... 33/542 |
| 5,949,330 A | * | 9/1999 | Hoffman et al. ............ 340/438 |

FOREIGN PATENT DOCUMENTS

| | | |
|---|---|---|
| EP | 0 031 716 | 7/1981 |
| EP | 0 107 338 | 5/1984 |
| JP | 59193306 | 11/1984 |
| JP | 62285012 | 12/1987 |
| JP | 04055713 | 2/1992 |
| JP | A-10-132546 | 5/1998 |
| JP | 11245687 | 9/1999 |
| WO | WO 93/23725 | 11/1993 |

* cited by examiner

Primary Examiner—Christopher W. Fulton
(74) Attorney, Agent, or Firm—Oliff & Berridge, PLC (57) ABSTRACT

The present invention provides an analog quantity display method of counting displacement of a probe disposed in contact with an object to be measured and analog-displaying the obtained count value by an analog display section as an analog quantity. If a peak value of the count value exceeds a possible analog-display range of the analog display section, an offset provided for the analog-displayed count value is updated in such a manner that the peak value is displayed within the possible analog-display range. Further, an analog quantity measuring method is provided, which comprises counting displacement of the probe, compares the obtained count value with a peak value of the count value, holds the count value as a new peak value depending upon a result of the comparison, and executes the comparison and the holding of the peak value again if the difference between the present peak value and the present count value exceeds a predetermined value. The analog quantity display and measuring methods are applicable to a digital/analog display type measuring instrument comprising a counter for counting the displacement of the probe in contact with the measured object, a digital display section for digitally displaying the count value, and an analog display section located adjacent to the digital display section, for displaying the count value as the bar graph comprising the large number of analog bars arranged in juxtaposition in one direction.

17 Claims, 7 Drawing Sheets

ANALOG RANGE IS EXCEEDED

FIG.3C

MINIMUM VALUE IS RESET
TO CENTRAL POSITION

ANALOG QUANTITY DISPLAY METHOD, ANALOG QUANTITY MEASURING METHOD, AND DIGITAL/ANALOG DISPLAY TYPE MEASURING INSTRUMENT

BACKGROUND OF THE INVENTION

1. Field of the Invention

The present invention relates to an analog quantity display method for displaying a measured analog quantity such as the size or shape of an object to be measured, an analog quantity measuring method for measuring the analog quantity, and a digital/analog display type measuring instrument for measuring an analog quantity such as the size or shape of an object to be measured.

2. Prior Art

As is well known, digital/analog display type measuring instruments such as dial gauges use a CRT display or a liquid crystal display to display a scale and a pointer as pictures or graphics in order to display results of measurements by analog display.

Since, however, analog display provided by such a CRT display or a liquid crystal display is actually in the form of digital display, its display resolution is limited. Therefore, it is generally difficult to display the scale and the pointer as pictures or graphics in detail, so that typical digital/analog display type measuring instruments require premeasurements using a gauge block.

Thus, the present assignee has proposed a digital/analog display type measuring instrument which allows both digital and analog measurements to be effectively executed even with omission of premeasurements using a gauge block, by Japanese Laid-Open Patent Publication (Kokai) No. 10-132546. That is, the proposed digital/analog display type measuring instrument has a large number of pointer segments arranged along a scale which indicate a measured value, and is characterized by including a switch which can independently switch an analog scale interval (weight per pointer segment), and a switch which can set a reference (zero) point for analog display at an arbitrary position of a probe.

However, the proposed digital/analog display type measuring instrument, which is used as a dial gauge or the like, displays the present measured value by lighting one of the large number of pointer segments arranged along the scale, thereby requiring the display to be relatively large in area. In addition, this instrument has a plurality of switches or the like for switching the analog scale interval and setting the reference point for analog display, resulting in a considerably large-sized display section.

Thus, the above conventional digital/analog display type measuring instrument has the disadvantage that if this measuring instrument is designed as a cylinder gauge for operation in a relatively small space, the display section of the gauge body has to be incomparably larger than the probe section. Therefore, this measuring instrument cannot be easily handled.

SUMMARY OF THE INVENTION

It is a first object of the present invention to provide an analog quantity display method and a digital/analog display type measuring instrument which require a relatively compact or small-sized display section and which is capable of constantly displaying, within an analog scale range, the present value, and upper and lower limit values of a set tolerance and peak values (minimum and maximum values), as well as the relationship between these values, without using switches for switching the analog scale interval and setting the reference point for analog display.

It is a second object of the present invention to provide an analog quantity measuring method which is capable of resuming a peak value hold function and automatically averaging a plurality of peak values to determine a measured value without any switch operation, thereby not only facilitating workpiece measurements and calibrations but also improving measuring reliability.

To attain the first object, according to a first aspect of the present invention, there is provided an analog quantity display method of counting displacement of a probe disposed in contact with an object to be measured, and analog-displaying a count value obtained by the counting, by an analog display section as an analog quantity, comprising the steps of displaying the count value by the analog display section as a bar graph comprising a large number of analog bars arranged in juxtaposition in one direction, and updating an offset provided for the analog-displayed count value in a manner such that a peak value of the count value is displayed within a possible analog-display range of the analog display section, if the peak value exceeds the possible analog-display range.

Preferably, the offset is updated in a manner such that the peak value is displayed at a substantially central position of the possible analog-display range of the analog display section.

Also preferably, the peak value is displayed by flickering at least one corresponding analog bar in the analog display section.

Also preferably, the peak value is displayed by changing display color of at least one corresponding analog bar in the analog display section.

Preferably, the analog quantity display method further includes the step of setting a measuring tolerance and setting the offset in a manner such that a numerical value of the set tolerance is displayed within the possible analog-display range of the analog display section.

More preferably, the step of setting the tolerance comprises setting a plurality of tolerance values as the tolerance and setting the offset and a display scale interval of the bar graph in a manner such that the plurality of tolerance values are displayed within the possible analog-display range of the analog display section.

In a preferred form, the step of setting the tolerance comprises setting a tolerance upper limit value and a tolerance lower limit value as the tolerance and setting the offset and a display scale interval of the bar graph in a manner such that the tolerance upper limit value and tolerance lower limit value are displayed symmetrically with respect to a central position of the possible analog-display range.

In a further preferred form, the step of setting the tolerance comprises setting the offset and the display scale interval of the bar graph in a manner such that the tolerance upper limit value and tolerance lower limit value are displayed symmetrically with respect to the central position of the possible analog-display range and such that a difference between the tolerance upper limit value and the tolerance lower limit value is substantially half the possible analog-display range.

Preferably, the numerical value of the set tolerance is displayed by reversing display state of at least one corresponding analog bar in the analog display section from a lighted state to an extinguished state or vice versa.

Also preferably, the numerical value of the set tolerance is displayed by changing display color of at least one corresponding analog bar in the analog display section.

Advantageously, the analog quantity display method is applied to a digital/analog display type measuring instrument comprising a counter for counting the displacement of the probe in contact with the measured object, a digital display section for digitally displaying the count value, and an analog display section located adjacent to the digital display section, for displaying the count value as the bar graph comprising the large number of analog bars arranged in juxtaposition in one direction.

To attain the second object, according to a second aspect of the present invention, there is provided an analog quantity measuring method comprising the steps of 1) counting displacement of a probe disposed in contact with an object to be measured, 2) comparing a count value obtained by the counting with a peak value of the count value and holding the count value as a new peak value depending upon a result of the comparison, and 3) executing the step 2) again if a difference between a present value of the peak value and a present value of the count value exceeds a predetermined value.

Preferably, the analog quantity measuring method further includes the step of repeatedly executing the step 2) whenever a new count value is obtained at the step 1) and holding and storing a plurality of peak values.

More preferably, the analog quantity measuring method further includes the step of averaging all the plurality of peak values stored to determine a measured value, in executing the step 2) in the step 3).

Advantageously, the analog quantity measuring method is applied to a digital/analog display type measuring instrument comprising a counter for counting the displacement of the probe in contact with the measured object, a digital display section for digitally displaying the count value, and an analog display section located adjacent to the digital display section, for displaying the count value as the bar graph comprising the large number of analog bars arranged in juxtaposition in one direction.

To attain the first object, according to a third aspect of the present invention, there is provided a digital/analog display type measuring instrument comprising a counter for counting displacement of a probe in contact with an object to be measured, a digital display section for digitally displaying a count value from the counter, an analog display section located adjacent to the digital display section, for displaying the count value as a bar graph comprising a large number of analog bars arranged in juxtaposition in one direction, and a control device for updating an offset provided for the analog-displayed count value in a manner such that a peak value of the count value is displayed within a possible analog-display range of the analog display section, if the peak value exceeds the possible analog-display range.

Typically, the digital/analog display type measuring instrument is a cylinder gauge for measuring bores of cylinders.

The above and other objects of the invention will become more apparent from the following drawings taken in conjunction with the accompanying drawings.

DETAILED DESCRIPTION OF PREFERRED EMBODIMENT

The present invention will be described below with reference to the drawings showing a preferred embodiment thereof.

Figure 1:
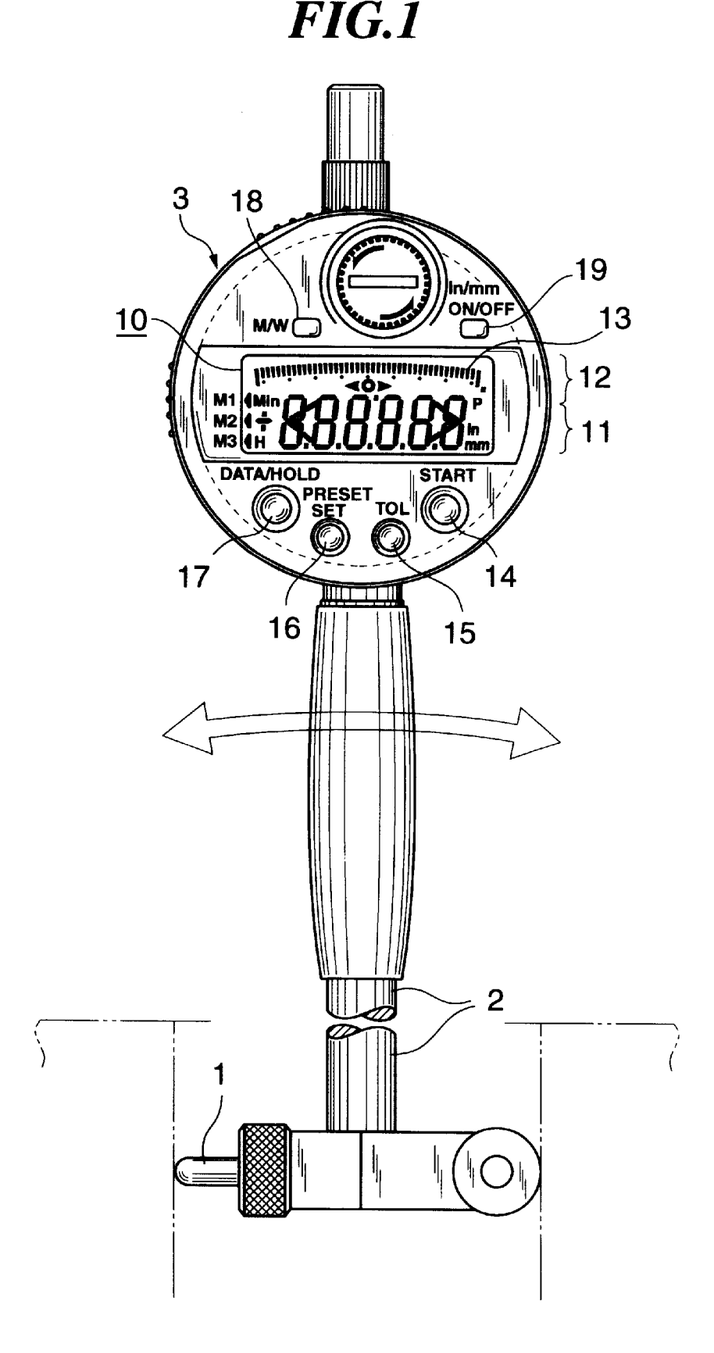
FIG. 1 is a front view showing a cylinder gauge to which the present invention is applied.

FIG. 1 shows a cylinder gauge to which the present invention is applied and which is used to measure the bores of cylinders. The cylinder gauge has a spindle (support) 2 pivotably supported on a gauge body 3 and having a probe 1 attached to one end thereof. The displacement of the probe 1 is displayed in both a digital display section 11 and an analog display section 12 of a liquid crystal display 10 in the gauge body 3.

That is, the digital display section 11 is comprised, for example, of 7-segment electrodes for a + or − sign and six digits for numerically indicating the displacement of the probe 1 so that the numerical value of displacement of the probe 1 can be directly read.

The analog display section 12 is comprised of a bar graph 13 formed of a large number of analog bars arranged in juxtaposition in a transverse direction as pointer segments. The displacement of the probe 1 is displayed by selectively reversely lighting the analog bars in such a manner that the analog bar at the right end indicates a maximum display value. As described below, a minimum value is displayed by flickering one analog bar, and upper and lower limit values of a set tolerance are displayed in a lighting state which is inverse to the lighting state of the analog bars indicating the present displacement.

Provided on the surface of the gauge body 3 are a start switch 14 for starting measurements, a tolerance setting switch 15 for setting a tolerance, a preset switch 16, a hold switch 17 for fixing a held value, a M/W switch 18, an ON/OFF switch, etc.

Figure 2:
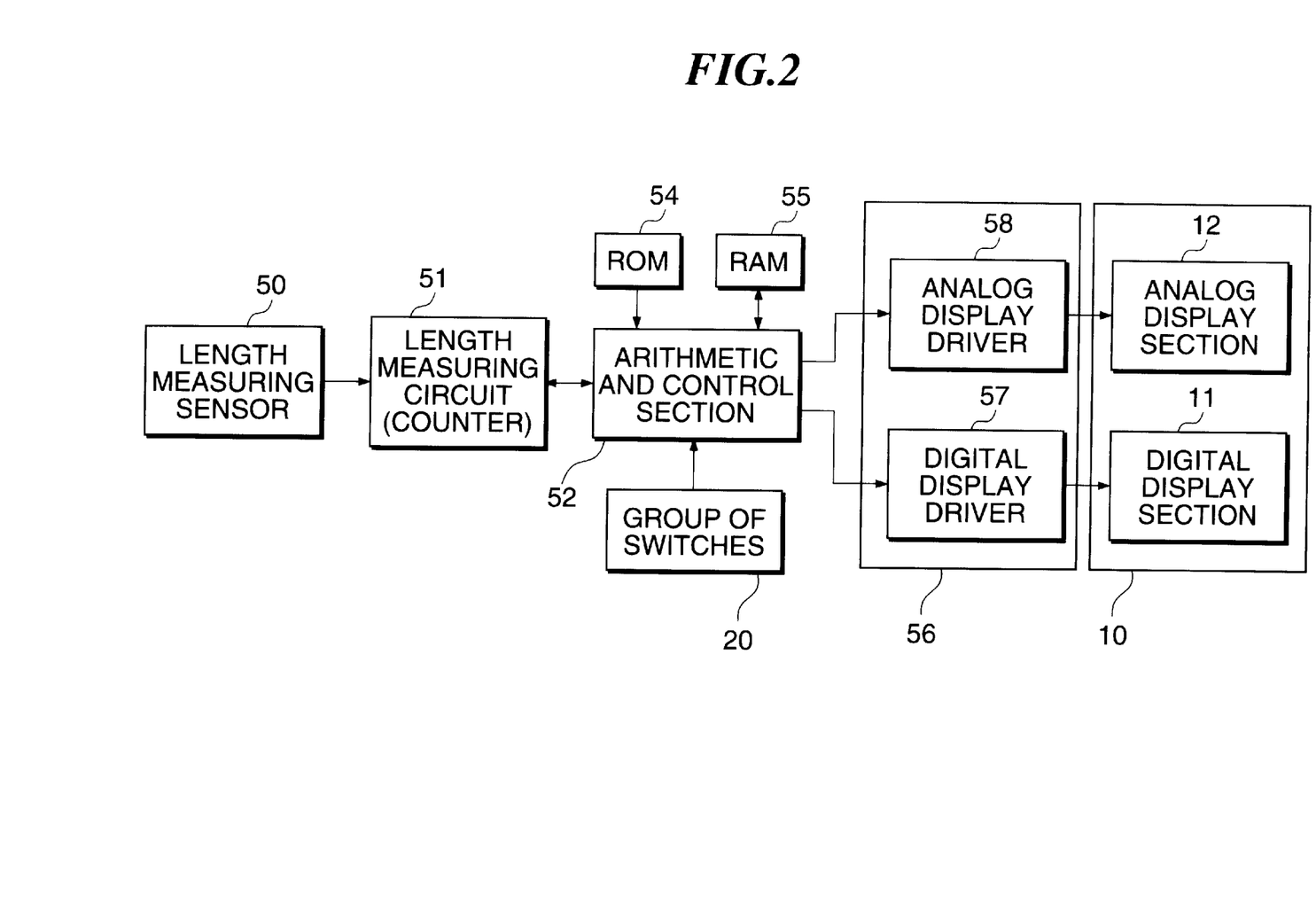
FIG. 2 is a block diagram showing the internal construction of the cylinder gauge.

The gauge body 3 has a length measuring sensor 50, shown in FIG. 2, built therein for converting the displacement of the spindle 2 following the displacement of the probe 1, into an electrical value. Output pulse signals from the length measuring sensor 50 are counted by a length measuring circuit (counter) 51 and output, for example, as binary coded decimal signals.

An output from the length measuring circuit 51 is input to an arithmetic and control section 52, which in turn controls the length measuring circuit 51 and a liquid crystal drive section 56 based on operations of a group of control switches 20. A ROM 54 stores an arithmetic and control program for this control.

In addition, a RAM 55 stores various data which are required to operate the arithmetic and control section 52 based on the arithmetic and control program.

The liquid crystal drive section 56 is comprised of a digital display driver 57 and an analog display driver 58 for driving the digital display section 11 and the analog display section 12 of the liquid crystal display 10, respectively. The arithmetic and control section 52 compares a count value from the length measuring circuit 51 with a calibration value or a bar graph-displayed minimum value and updates a control signal provided for the analog display driver 58, that is, an offset of a bar graph-displayed value depending on a result of the comparison, as described below.

Next, the control operation of the cylinder gauge according to this embodiment will be described with reference to FIGS. 5 to 7.

Figure 5:
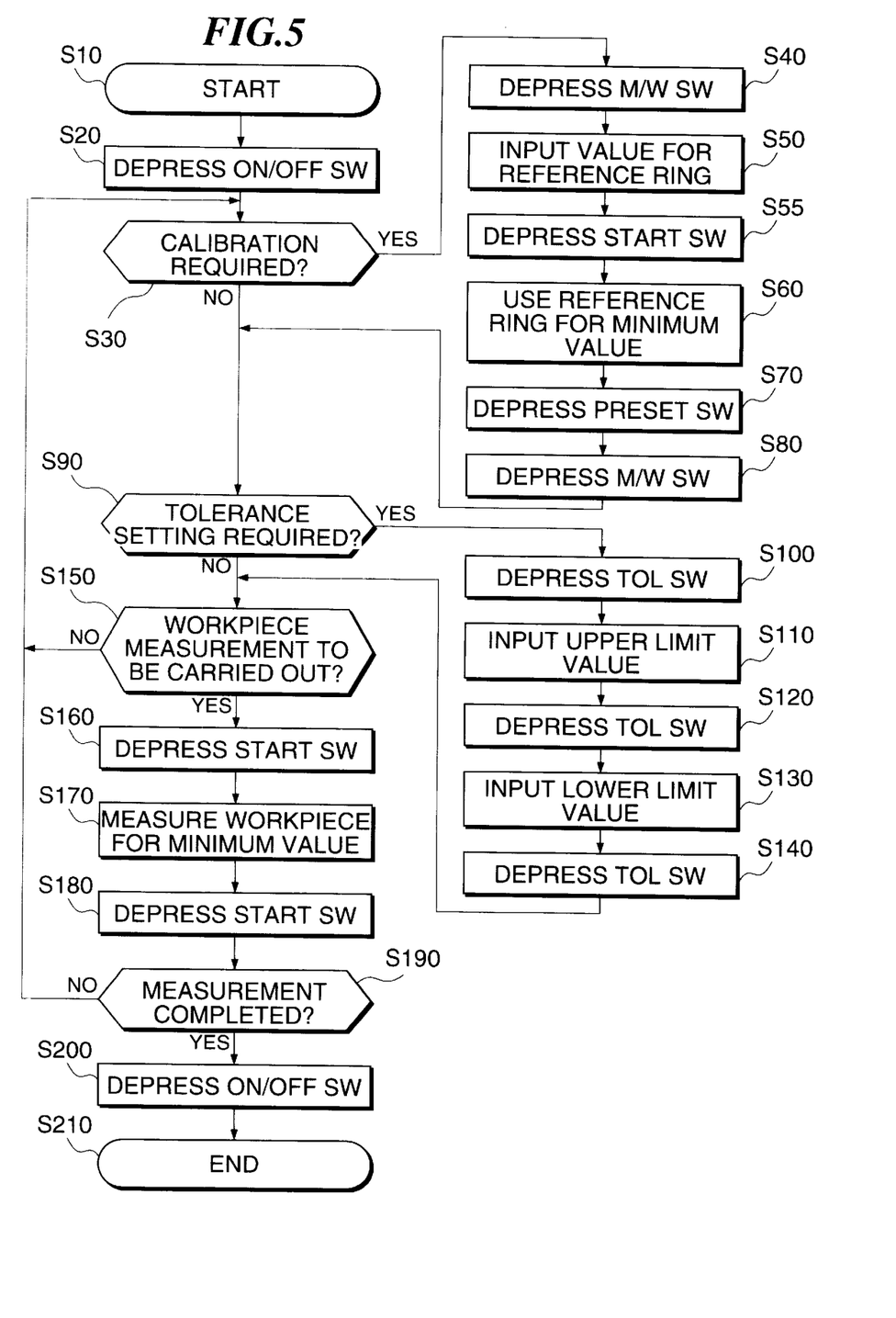
FIG. 5 is a flowchart showing an operating procedure carried out to calibrate the cylinder gauge using a reference ring and then measure a workpiece.

FIG. 5 shows an operating procedure carried out to calibrate the cylinder gauge using a reference ring (not shown) and then measure a workpiece.

First, at a step S10, the present procedure is started, and then, at a step S20, the cylinder gauge is powered on to enter a measurement mode when the ON/OFF switch 19 is depressed.

Next, at a step S30, the operator checks whether or not calibration is required. If calibration is required, the process transfers to a step S40, in which when the M/W switch 18 is depressed, the cylinder gauge enters a master adjustment mode (calibration mode).

Subsequently, at a step S50, the preset switch 16 is used to input a value related to the reference ring (calibration value), and then the start switch 14 is depressed to prepare for measurement of the reference ring (start of a minimum value hold function) (step S55).

Then, at a step S60, the cylinder gauge is used to measure the reference ring and a minimum value is determined using the minimum value hold function. Subsequently, the preset switch 16 is depressed (step S70) to update the offset of the bar graph-displayed value in the liquid crystal display 10 such that the position of the minimum value determined at the step S60 becomes equal to the calibration value. The updated offset value is equal to the last or old offset + (the minimum value − the calibration value).

After the updating of the offset to the new offset, at a step S80, when the M/W switch 18 is depressed, the calibration gauge is switched to the measurement mode.

After the checking at the step S30 as to whether or not calibration is required or after the calibration at the steps S40 to S80, the process proceeds to a step S90, where the operator checks whether or not setting of a tolerance, that is, the upper and lower limit values of the tolerance is required. If the setting is required, the process proceeds to a step S100. At the step S100, the tolerance setting switch 15 is depressed to prepare for inputting of an upper limit value, and at a step S110, the tolerance setting switch 15 is operated to input the upper limit value. Then, when the tolerance setting switch 15 is depressed at a step S120, inputting of a lower limit value is prepared, and at a step S130, the tolerance setting switch 15 is operated to input the lower limit value.

Thereafter, when the tolerance setting switch 15 is depressed again at a step S140, the tolerance setting is completed. In this manner, the upper and lower limit values of the tolerance are set.

Next, at a step S150, the operator determines whether or not a workpiece measurement operation is to be performed. If the operation is to be performed, then at a step S160, the start switch 14 is depressed to prepare for workpiece measurement (start of the minimum value hold function).

Then, at a step S170, the cylinder gauge is used to measure the diameter of a workpiece (a minimum value is determined using the minimum value hold function), and the measured diameter value is set as the measured value. Then, at a step S180, the start switch 14 is depressed to complete the minimum value hold function.

Subsequently, the operator checks at a step S190 whether or not the measurement has been completed. If the measurement has been completed, then at a step S200, the ON/OFF switch 19 is operated to terminate the operation and the cylinder gauge is powered off to terminate the process (step S210). In this case, to further continue the measurement, the process returns to the step S10.

Setting Numerical Value

As described above, at the step S50, the preset switch 16 is operated to input the calibration value, and at the steps S110 and S130, the tolerance setting switch 15 is manually operated to input the upper and lower limit values. Such a method of inputting a numerical value of a plurality of digits using one switch is conventionally frequently used, and description thereof is therefore omitted.

Displaying Count Value

Figure 6:
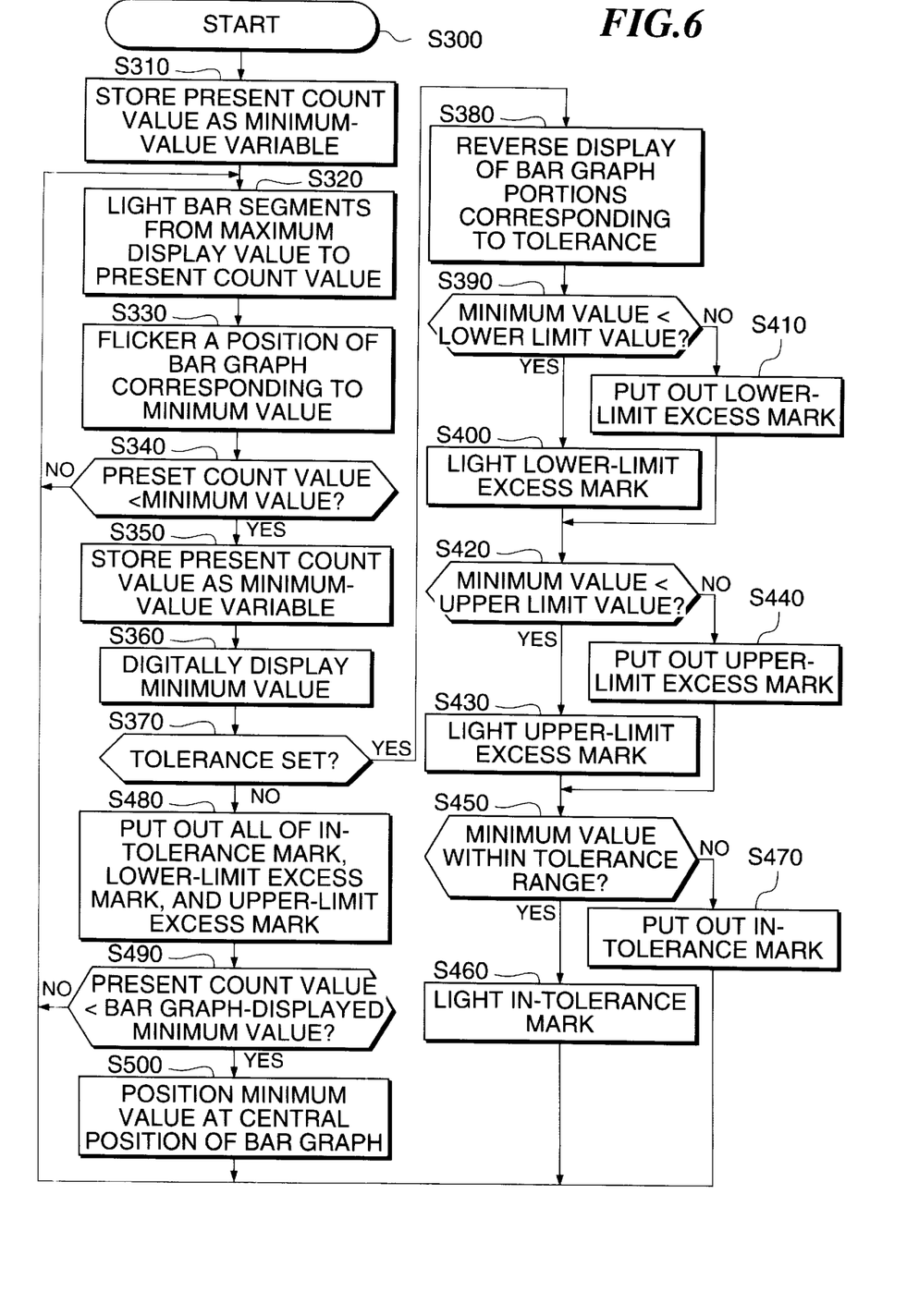
FIG. 6 is a flowchart showing a digital/analog-display procedure for displaying a count value using a minimum-value hold function.

FIG. 6 shows a digital/analog-display procedure for displaying a count value using the minimum value hold function.

When the procedure is started at a step S300, the present count value is stored in a minimum-value variable area of the RAM 55 as a minimum-value variable at a step S310 to prepare for measurement (the simple term "minimum value" in the following description refers to the value stored as this variable).

Then, at a step S320, all the bar segments of the bar graph starting with a maximum display value (located at the right end of the bar graph) and ending with the present count value are lighted. Although some analog-display methods provide the analog display of only a bar segment corresponding to the present count value, the method of displaying a corresponding area, as employed at the step S320, provides a higher visibility for a small-sized display.

Figure 3A:
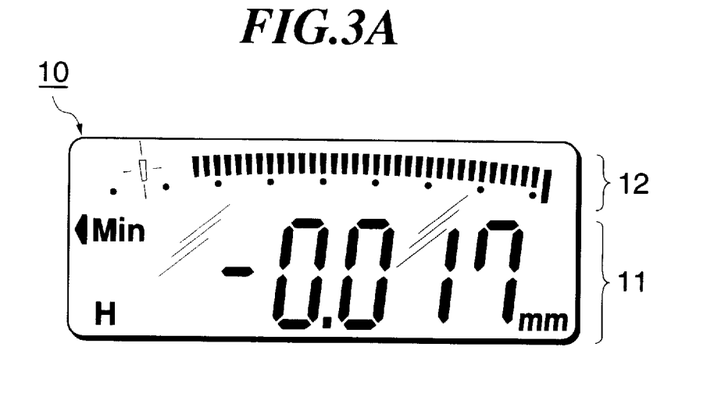
FIGS. 3A, 3B, and 3C show display states of a display section of the cylinder gauge where upper-limit and lower-limit values of a set tolerance are not set.

Next, the process proceeds to a step S330 to flicker a bar segment located at a position corresponding to the minimum value as shown in FIG. 3A. Alternatively, for a display such as a CRT display which has a color bar graph, the corresponding bar segment may be displayed in different colors.

Then, at a step S340, it is checked whether or not the present count value is smaller than the minimum value. If former is smaller than the latter, the process proceeds to a step S350. Otherwise, the process returns to the step S320.

At the step S350, the present count value is stored in the minimum-value variable area of the RAM 55 and digitally displayed as a minimum value (step S360). In this case, at a step S370, it is checked whether or not a tolerance has been set. If the tolerance has been set, a step S380 and subsequent steps are executed.

Figure 4A:
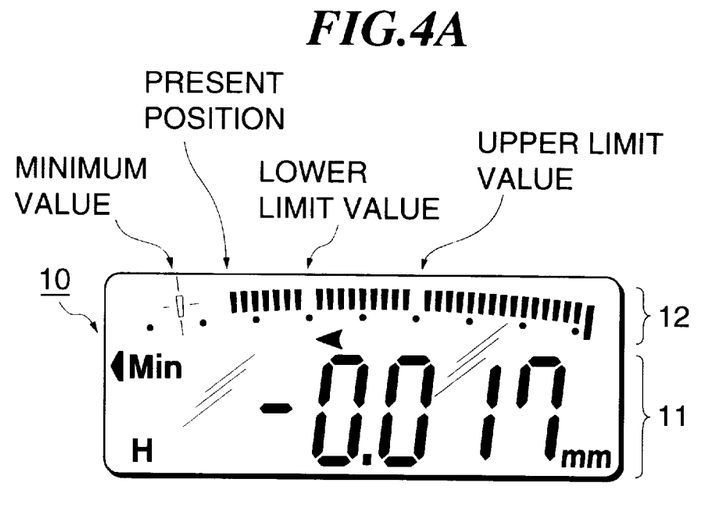
FIGS. 4A, 4B, and 4C show display states of the display section of the cylinder gauge where the upper-limit and lower-limit values of the set tolerance are set.

That is, at the step S380, the display of bar segments at the tolerance positions (upper and lower limit values) of the bar graph is reversed (as shown in FIG. 4A). That is, the reversal in this case means that lighted bar segments are put out, or dark bar segments are lighted, but for a display having a color bar graph, the bar segments may be displayed in different colors.

Figure 4B:
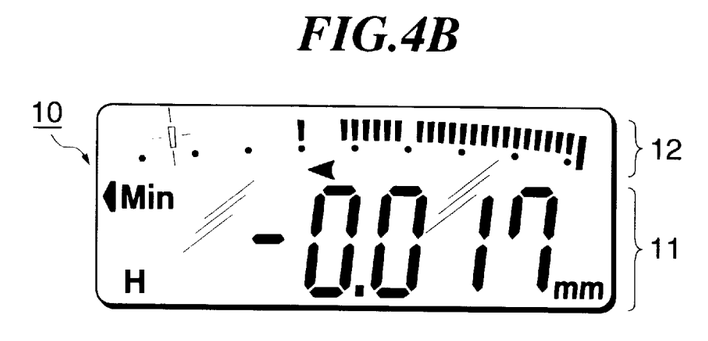
Figure 4C:
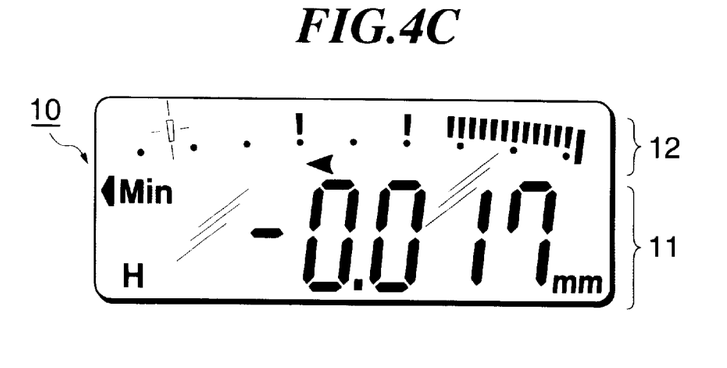

Then, it is checked whether or not the present count value digitally displayed as the minimum value is smaller than the set tolerance lower limit value (step S390), and if the present count value, that is, the minimum value is smaller than the tolerance lower limit value, the process proceeds to a step S400 to light a lower-limit excess mark (<) (FIGS. 4A, 4B, and 4C). If the result of the checking shows that the present count value is not smaller than the tolerance lower limit value, the lower-limit excess mark (<) is not lighted or extinguished (step S410).

Next, it is checked at a step S420 whether or not the present count value is larger than the set tolerance upper limit value. If the former is larger than the latter, an upper-limit excess mark (>) is lighted (step S430). If the present count value is not larger than the tolerance upper limit value, the process proceeds to a step S440 to extinguish the upper-limit excess mark (>).

Then, at a step S450, it is determined whether or not the minimum value is within the tolerance range, that is, the lower limit value≦the minimum values≦the upper limit value. If the minimum value is within the tolerance range, the process proceeds to a step S460 to light an in-tolerance mark (○), which is shown in FIG. 1.

Figure 3B:
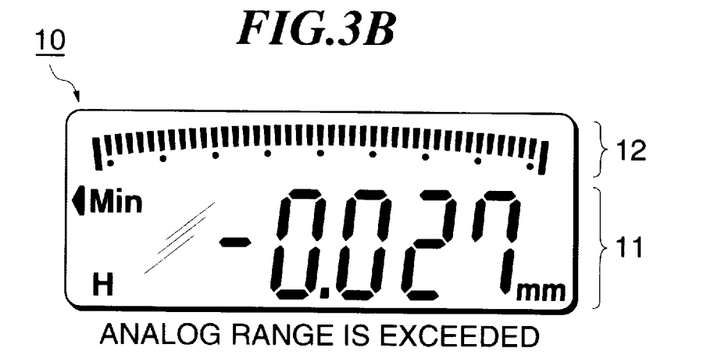
Figure 3C:
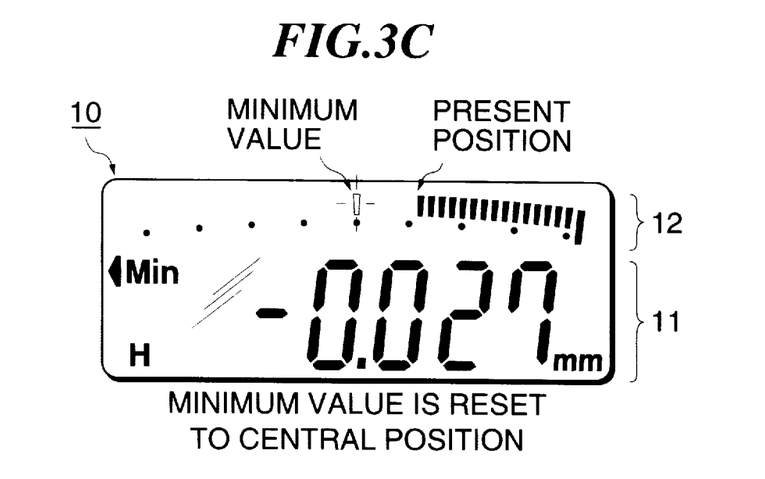

Of course, if the minimum value is not within the tolerance range, the in-tolerance mark (○) is not lighted. If, however, the check for a tolerance setting at the S370 determines that no tolerance has been set, then at a step S480, none of the in-tolerance mark (○), the lower-limit excess mark (<), and the upper-limit excess mark (>) is lighted, as shown in FIGS. 3A, 3B, and 3C.

Subsequently, at the next step S490, it is checked whether or not the present count value is smaller than the bar graph-displayed minimum value. If the former is smaller than the latter, the process proceeds to a step S500 to change the offset of the bar graph-displayed value such that the minimum value is located at the center of the bar graph. That is, the bar graph cannot display the overall count area but can display only a range between C and C+R, where "C" denotes the offset of the bar graph-displayed value, and "R" denotes the display range of the bar graph.

In addition, as will be understood from the flowchart in FIG. 6, if the tolerance has been set, the step S500 is not executed, whereby the offset of the bar graph-displayed value is not changed and only the tolerance values and their neighborhood, which will be described below, are displayed in the bar graph.

Tolerance Display Method

If the tolerance has been set, the segments located at the positions of the upper and lower limit values are displayed as described above, and this display (lighting or extinction) is provided at the step S380 described above. That is, the relationship in location between the upper and lower limit values on the bar graph in this case is adjusted as follows: The offset of the bar graph-displayed value is changed in such a manner that the value of D+(U−D)/2 is located at the center of the bar graph and the upper and lower limit values are displayed symmetrically with respect to the center of the bar graph, and the scale interval of the displayed bar graph (the weight of one segment) is defined by 2(U−D)=R, where D designates the lower limit value, and U designates the upper limit value.

Automatic Updating of Held Minimum Value

In carrying out the calibration or measurement, plural times of remeasurements are required because a single measurement cannot typically determine the effects of variations. In this case, the flowchart in FIG. 5 requires the procedure of the step S60 to be executed for calibration while requiring the procedure of the step S170 to be executed for measurement, so that the start switch 14 has to be depressed each time the minimum value hold function is resumed. "Automatic updating of held minimum value" avoids troubles involved in this resumption procedure. "Automatic updating of held minimum value" is a function of automatically updating the held minimum value, and this function automatically averages a plurality of automatically updated minimum values to determine a measured value.

Figure 7:
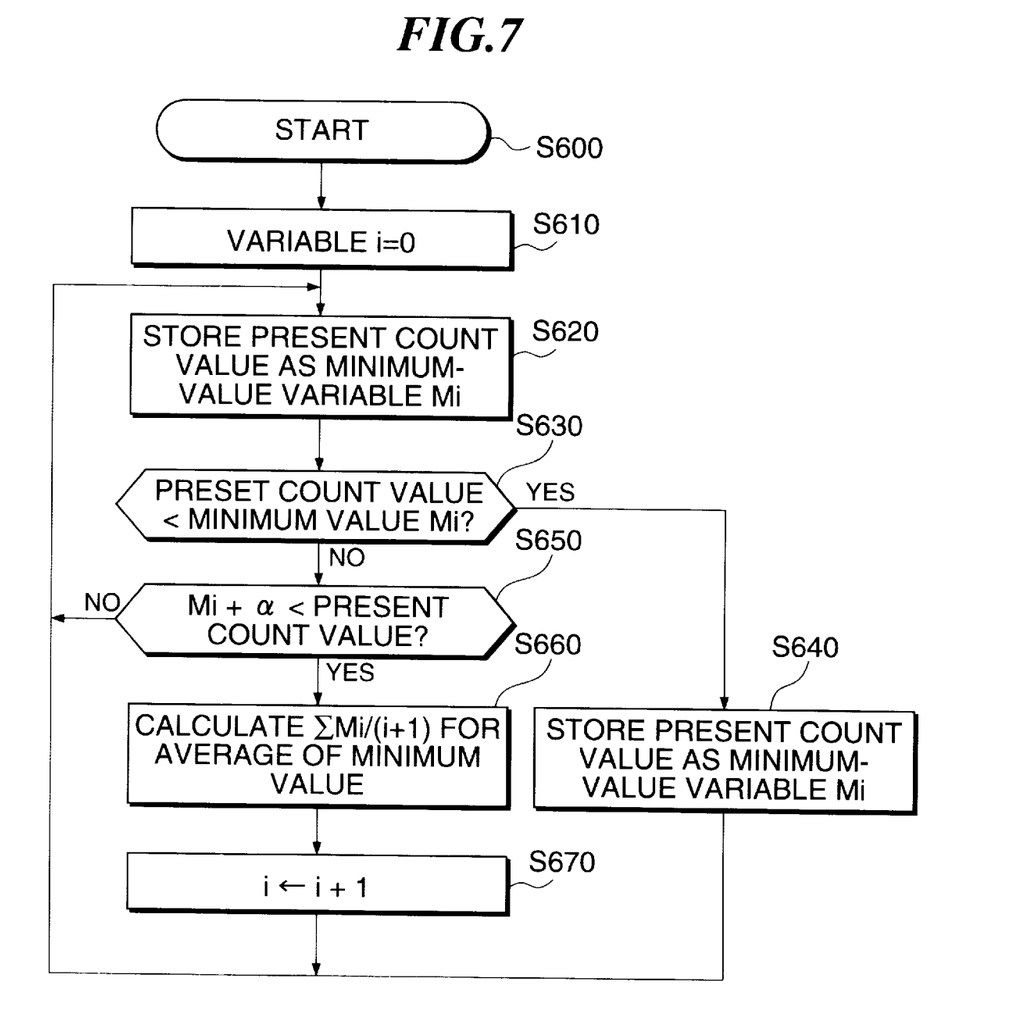
FIG. 7 is a flowchart showing an operating procedure executed by the cylinder gauge during automatic updating of a held minimum value.

FIG. 7 is a flowchart of the operation of "Automatic uploading of held minimum value".

First, when the procedure is started at a step S600, a variable (i) is initialized to 0 at step S610 to prepare for measurement. Then, the present count value is stored in the minimum-value variable area of the RAM 55 as a minimum-value variable Mi (i=0, 1, 2, . . . ). (step S620). When this processing is first executed, the present count value is stored as a minimum-value variable M0 because the minimum-value variable Mi has its variable (i) initialized to 0 at the step S610.

Then, at the next step S630, it is determined whether or not the present count value is smaller than the present value of the minimum-value variable Mi. If the former is smaller than the latter, the process proceeds to a step S640 to update the value of the minimum-value variable Mi to the present count value.

On the other hand, if the present count value is larger than the present value of the minimum-value variable Mi, the process proceeds to a step S650 to determine whether or not the present count value is larger than the present value of the minimum-value variable Mi by a fixed value α or more. If the former is larger than the latter, it is determined that the minimum value hold function should be resumed, that is, the minimum value held at the step S620 or S640 should be updated. Then, the process proceeds to a step S660, where the plurality of minimum values (M0, M1, M2, . . . . ) are averaged to set the average value obtained as the measured value, and then the variable (i) incremented by one at a step S670. Subsequently, the process returns to the step S620 to again execute the operation starting at the step S620.

This procedure of FIG. 7 enables the minimum value hold function to be resumed by simply determining the minimum value a number of times and without the need of any switch operation, while enabling a plurality of minimum values to be automatically averaged to determine the measured value, thereby not only facilitating workpiece measurement or calibration but also improving measuring reliability.

Although in the above described embodiment, the present invention has been applied to a cylinder gauge, of course it is also applicable to other digital/analog display type measuring instruments such as a dial gauge, a micrometer, a vernier caliper, a height gauge, a depth gauge, and a test indicator.

What is claimed is:

1. An analog quantity display method of counting displacement of a probe disposed in contact with an object to be measured, and analog-displaying a count value obtained by the counting, by an analog display section as an analog quantity, comprising the steps of:

displaying said count value by said analog display section as a bar graph comprising a large number of analog bars arranged in juxtaposition in one direction;

when a peak value exceeds said an initial analog-display range, performing an automatic update of an offset provided for said analog-displayed count value in a manner such that the peak value of said count value is displayed within an updated analog-display range of said analog display section; and resuming and holding in a memory said peak value and automatically averaging a plurality of peak values to display a measured value.

2. An analog quantity display method according to claim 1, wherein said offset is updated in a manner such tat said peak value is displayed at a substantially central position of the updated analog-display range of said analog display section.

3. An analog quantity display method according to claim 1, wherein said peak value is displayed by flickering at least one corresponding analog bar in said analog display section.

4. An analog quantity display method according to claim 1, wherein said peak value is displayed by changing display color of at least one corresponding analog bar in said analog display section.

5. An analog quantity display method according to claim 1, further including the step of setting a measuring tolerance and setting said offset in a manner such that a numerical value of the set tolerance is displayed within the updated analog-display range of said analog display section.

6. An analog quantity display method according to claim 5, wherein the step of setting said tolerance comprises setting a plurality of tolerance values as said tolerance and setting said offset and a display scale interval of said bar graph in a manner such that said plurality of tolerance values are displayed within the updated analog-display range of said analog display section.

7. An analog quantity display method according to claim 5, wherein the step of setting said tolerance comprises setting a tolerance upper limit value and a tolerance lower limit value as said tolerance and setting said offset and a display scale interval of said bar graph in a manner such that said tolerance upper limit value and tolerance lower limit value are displayed symmetrically with respect to a central position of said updated analog-display range.

8. An analog quantity display method according to claim 7, wherein the step of setting said tolerance comprises setting said offset and the display scale interval of said bar graph in a manner such that said tolerance upper limit value and tolerance lower limit value are displayed symmetrically with respect to the central position of said possible analog-display range and such that a difference between said tolerance upper limit value and said tolerance lower limit value is substantially half said updated analog-display range.

9. An analog quantity display method according to claim 5, wherein said numerical value of the set tolerance is displayed by reversing display state of at least one corresponding analog bar in said analog display section from a lighted state to an extinguished state or vice versa.

10. An analog quantity display method according to claim 5, wherein said numerical value of the set tolerance is displayed by changing display color of at least one corresponding analog bar in said analog display section.

11. An analog quantity display method according to claim 1, which is applied to a digital/analog display type measuring instrument comprising a counter for counting the displacement of the probe in contact with the measured object, a digital display section for digitally displaying the count value, and an analog display section located adjacent to the digital display section, for displaying the count value as the bar graph comprising the large number of analog bars arranged in juxtaposition in one direction.

12. An analog quantity measuring method comprising the steps of:

counting a displacement of a probe disposed in contact with an object to be measured;

holding a count value obtained by said counting as a present peak value;

performing an automatic comparison of the held present peak value with a new count value obtained by said counting and holding the new count value as a new peak value if the new count value is smaller than the present held peak value; and executing said automatic comparison again if a difference between the held present peak value and the new count value exceeds a predetermined value.

13. An analog quantity measuring method according to claim 12, further including the step of repeatedly executing said step 2) whenever a new count value is obtained at said step 1) and holding and storing a plurality of peak values.

14. An analog quantity measuring method according to claim 13, further including the step of averaging all the plurality of peak values stored to determine a measured value, in executing said step 2) in said step 3).

15. An analog quantity measuring method according to claim 12, which is applied to a digital/analog display type measuring instrument comprising a counter for counting the displacement of the probe in contact with the measured object, a digital display section for digitally displaying the count value, and an analog display section located adjacent to the digital display section, for displaying the count value as the bar graph comprising the large number of analog bars arranged in juxtaposition in one direction.

16. A digital/analog display type measuring instrument comprising:

a counter for counting displacement of a probe in contact with an object to be measured;

a digital display section for digitally displaying a count value from said counter;

an analog display section located adjacent to the digital display section, for displaying said count value as a bar graph comprising a large number of analog bars arranged in juxtaposition in one direction;

a control device for automatically updating an offset provided for said analog-displayed count value in a manner such that a peak value of said count value is displayed within an updated analog-display range of said analog display section, when a peak value exceeds an initial analog-display range, and resuming and holding in a memory said peak value and automatically averaging a plurality of peak values to display a measured value.

17. A digital/analog display type measuring instrument according to claim 16, which is a cylinder gauge for measuring bores of cylinders.

* * * * *